Nov. 21, 1944.  G. A. RUBISSOW  2,363,363
AUTOMATIC SYSTEM FOR CONTROLLING THE DIRECTION OF MOVING BODIES
Filed Aug. 30, 1940  6 Sheets-Sheet 1

INVENTOR.
George A. Rubissow Nov. 21, 1944. G. A. RUBISSOW 2,363,363
AUTOMATIC SYSTEM FOR CONTROLLING THE DIRECTION OF MOVING BODIES
Filed Aug. 30, 1940 6 Sheets-Sheet 5

INVENTOR.
George A. Rubissow.

Nov. 21, 1944. G. A. RUBISSOW 2,363,363
AUTOMATIC SYSTEM FOR CONTROLLING THE DIRECTION OF MOVING BODIES
Filed Aug. 30, 1940 6 Sheets-Sheet 6

INVENTOR.
George A. Rubissow.

Patented Nov. 21, 1944

2,363,363

UNITED STATES PATENT OFFICE 2,363,363

AUTOMATIC SYSTEM FOR CONTROLLING THE DIRECTION OF MOVING BODIES

George A. Rubissow, New York, N. Y.

Application August 30, 1940, Serial No. 354,893

16 Claims. (Cl. 114—20)

This invention is of military importance and refers to a robot device which enables an automatically directed moving body, such as a torpedo, mine, boat, submarine and the like to automatically follow a predetermined course through the air or the sea or on the ground, and/or to automatically reverse itself or change its position at any time. This invention also enables the actuation of a direction propeller mounted on the moving body which produces a rotary action about a vertical axis whereat the main motor or turbine switches on and the body returns to its home base or follows a new predetermined course. The course may be straight, curved or both.

This invention is especially applicable in combination with the direction controlling device of the character referred to in the United States Patent #2,341,287 which is a mechanical means to control the course of moving bodies in horizontal or vertical planes, or both.

This invention establishes a new war tactic and provides a new weapon highly dangerous in its action and absolutely unfathomable to the enemy as to its orientation while in movement.

The novel features of this invention will more fully appear from the following description when the same is read in connection with the accompanying drawings and the appended claims. It is to be expressly understood, however, that the drawings are for purposes of schematical illustration only.

Figure 1:
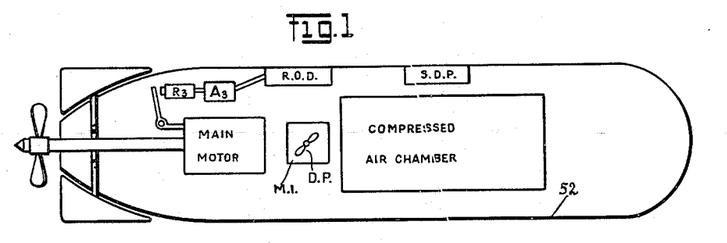
Figure 1 is a schematical view in longitudinal cross-section of a torpedo provided with the robot orientation device of the character described.
Figure 8:
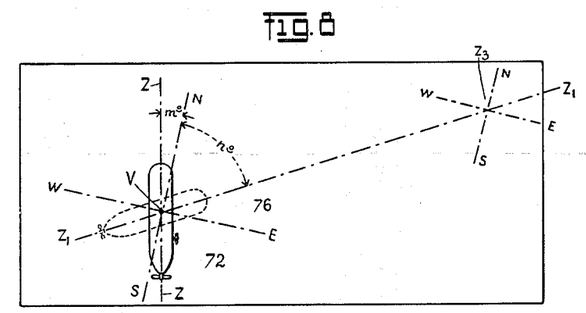
Figure 8 represents a diagrammatical view of a torpedo provided with a robot orientation device (ROD) showing the manner in which the torpedo is turned and where the torpedo is after a certain lapse of time.
Figure 9:
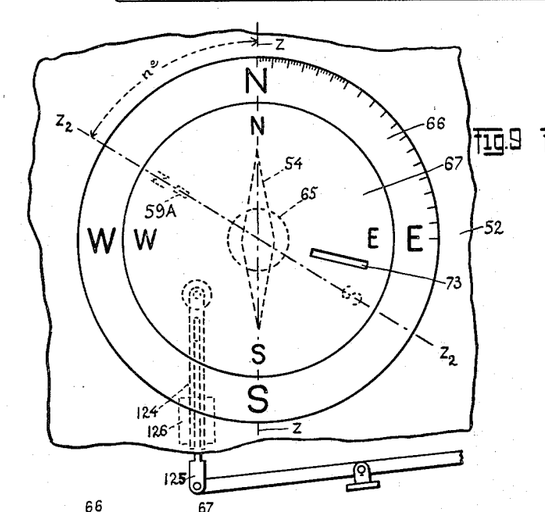
Figure 9 is a plan view of the controlling disk and dial of the robot orientation device.

One aspect of this invention comprises the robot orientation device 50, Figures 1, 8, and 9, which may be mounted inside or outside of the moving body of the type described.

This device may be any known type of navigation compass, magnetic or electro-magnetic radio-beam or any other suitable type, provided that it possesses a direction finder—needle or indicator—in the form of a needle, disk or segment, etc. . . . To simplify this description, an ordinary compass, having a magnetic needle of a navigation type (marine or air) will be illustrated, but this invention is not limited thereto and any type may be used as stated above.

Figure 2:
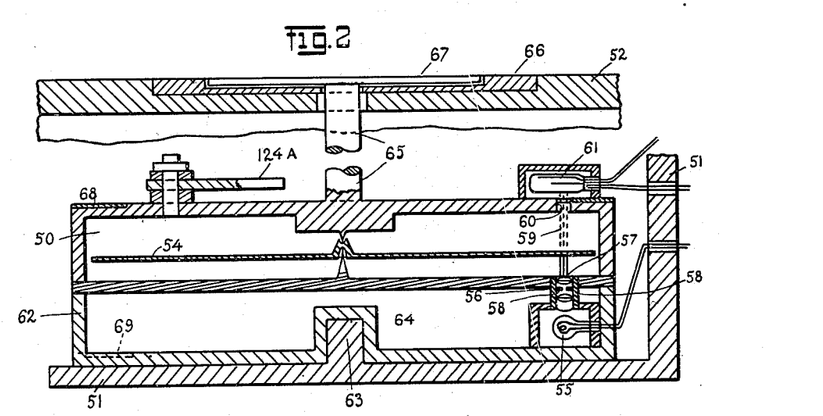
Figure 2 is a schematical cross-sectional view of an aspect of the robot orientation device.
Figure 3:
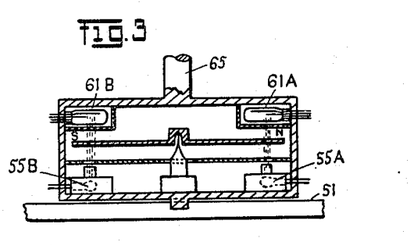
Figure 3 is a diagrammatical view of another aspect of the robot orientation device.

Figures 1 and 2 show a robot orientation device as a compass 50 having a needle 54 and a source of light 55 placed below the needle 54. The beam of light 59 is preferably guided by a guide-member 56 of any shape and diameter or by a slit 58 or lenses 57 mounted to provide the concentrated light beam 59 of the required shape and size. The combination of slit 58 and lenses 57—57 may be employed to provide the necessary beam. The beam 59 enters into an opening 60 and falls on the photoelectric cell 61 which under the action of the beam of light energizes an electric current that is thereafter transmitted to an amplifier $A_2$ and relay or solenoid $R_2$, Figure 14. As soon as the beam is cut by the needle 54 when the needle passes between the beam and the photoelectric cell, the current in the cell is cut or changed and the relay $R_2$ accordingly actuated.

The light source may be simply an electric lamp, infra-red or ultra-violet light. The photoelectric cell or electronic tube or like element may be of any type suitable for the receiving of impulses from the beam of light which actuates or modifies it.

The frame 62 of the robot orientation device compass 50 is mounted on a pivot 63 around which it rotates. Instead of the pivot 63 and the bearing 64 provided in the frame 62, the frame may simply be a cylindrical hole through which an axle affixed to the support 51 passes. This is not shown on the drawings, being self-explanatory.

The frame 62 is additionally provided with an axle 63, preferably co-axial with the pivot or axle 63. The axle 63 which extends to the fixed orientation dial 66 is provided on its outer end with an orientation controlling member 67 preferably disk-shaped as shown on Figures 2 and 9.

The orientation dial 66 is rigidly affixed to the frame 52 of the torpedo and in its non-operative position indicates in predetermined condition the North-South line. The fixed orientation dial 66 may, if desired, also be provided on the compass frame 62 or inside of the compass 69, or outside thereof 68. The dials 68 or 69 are not an essential requirement.

It is obvious that measures must be taken to prevent the needle 54 from being influenced electrically and magnetically by the torpedo mass, motors, etc. . . . wherefore, if necessary, a correction factor should be introduced in the mounting and/or operating of the robot orientation device and the dial 66 in particular.

Figure 4:
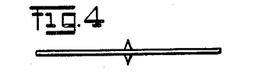
Figure 4 represents a side-view of a magnet needle.
Figure 5:
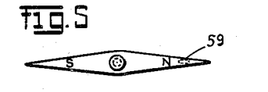
Figure 5 represents a plan-view of Figure 4.
Figure 6:
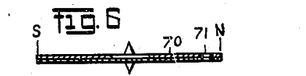
Figure 6 represents a side-view partly in cross-section of another type of magnet needle mounted on a disk support.
Figure 7:
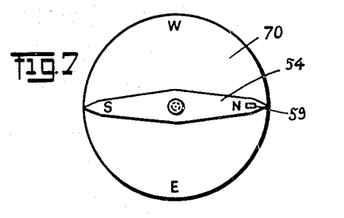
Figure 7 represents a plan-view of Figure 6.

The needle 54 may be as shown on Figures 4 and 5 or it may be mounted on a continuous disk 70, Figure 7, in which a hole 71 is provided. The disk operates in the same manner as the needle but the beam 59 will be unable to pass through to the cell 61 unless the hole 71 registers the beam. The common type of needle 54 actuates the relay by cutting the beam between needle and cell, whereas the disk-type needle 70 actuates it by providing an access for such a beam.

For the convenience of the description and illustration of how the robot orientation device of the character described herein operates, let us assume that V, Figure 8, is a point on the line $Z_1$—$Z_1$, at point $Z_3$ of which the enemy is supposed to be lying. Let us also assume that the torpedo falls into the sea at point V and that before its propeller is actuated, it takes the place 72 shown on Figure 8, i. e. the longitudinal axis Z—Z of the torpedo will be non-coincident with the predetermined course $Z_1$—$Z_1$. In such case, the torpedo 72 will turn so that its nose points in the course the torpedo will take when its longitudinal axis Z—Z, Figure 13, coincides with $Z_1$—$Z_1$.

The $n°$ shown on Figure 8 represents the degree which the torpedo must turn in order to coincide its axis Z—Z with the line $Z_1$—$Z_1$.

The direction or course $Z_1$—$Z_1$ is determined by two points—the point $Z_3$ where the enemy is situated and the point V through which the vertical axis V—V of the torpedo passes.

This invention offers a method and robot means to enable the axis Z—Z to automatically coincide with the course $Z_1$—$Z_1$.

By way of example, the dial 66 of the robot orientation device is so located that the N (North) point of the dial 66 coincides with the longitudinal axis Z—Z of the torpedo. With such an arrangement (Figures 8, 9, 13) all that is required is for the torpedo to turn $n°$ around its axis V—V from North to East and thereafter actuate its propeller.

Assuming that the pilot of an aeroplane knows that the enemy's ships are lying at point $n°$ from North to East (true compass indication), the controlling disk 67 is then turned $n°$ with its dial turned from North to West. The compass frame 62 then respectively turns $n°$ from North to West, the axle 65 being in this case rigid with the frame 62.

The controlling disk 67 in its normal non-operative position may be synchronized with the North point of the frame 62, i. e. synchronized and coincident with the longitudinal axis Z—Z of the torpedo. When the N point of the controlling disk 67 is turned $n°$ to the West from N at 66, it takes the new position shown in dotted line passing through $Z_2$—$Z_2$. The beam 59A is also accordingly situated at $Z_2$—$Z_2$.

Figure 13:
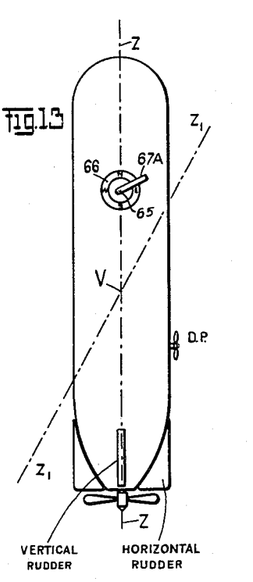
Figure 13 is a schematical plan view of a torpedo provided with the direction propeller described herein.

No matter what direction the torpedo will take as it falls into the sea, the indication needle, such as, for instance, the magnet needle 54 of the compass, will automatically register the beam 59A only when the torpedo 72 is turned by means of the direction propeller around its V—V axis, as shown on Figures 8 and 13. The torpedo may turn from North to East or West and while so doing will unfailingly place the magnet needle 54 in register with the beam 59A.

In practice, the torpedo may be launched as soon as the afore-mentioned $n°$ has been defined, and the disk 67 turned accordingly. It will start to rotate substantially around its vertical axis V—V as soon as it hits the sea. This is shown on Figure 13. The torpedo will be rotated either by the waves or the current if such be present, or by means of the special motor-driven direction propeller device herein described and shown on Figures 1, 13, 14. This device starts to operate automatically as soon as the torpedo contacts the sea, and as soon as the longitudinal symmetry axis Z—Z of the torpedo 72, Figure 8, substantially coincides with the required course $Z_1$—$Z_1$; i. e. when the magnet needle 54 of the robot compass 50 indicates the angle $n°$ with the N point of the orientation dial 66.

To operate the orientation disk 67, a slot 73, or an upright arresting member 73 may be provided thereon. Instead of this disk, a segment or a lever 67A, Figure 13, rigidly affixed to the axis 65 may be employed, whereby when the magnet needle 54 registers the beam 59, it will signify that the torpedo is taking the direction $Z_1$—$Z_1$. Simultaneously, the current will be changed in the photoelectric cell or element 61, and will thus actuate the relay or solenoid $R_3$ with the assistance of an amplifier $A_3$, shown on Figures 1 and 14. At the same time, the direction propeller DP, Figures 1 and 14, will instantly stop running, the main motor which actuates the screw or propellers of the torpedo will switch on, and the direction controlling device D. C. D., Figure 14, will start operating. This direction controlling device previously referred to herein, is the mechanical means for the control of the course of moving bodies in horizontal or vertical planes, or both, invented jointly by the author, George A. Rubissow, and George Pookhir, and fully described in the United States Patent #2,341,287 aforesaid.

Hence, this invention is a robot device which, in combination with the aforementioned direction controlling device enables a torpedo or other moving body in the sea, in the air, or on the ground, to automatically turn about from one position and assume another position at any time, and to thereafter follow a predetermined course.

Figure 11:
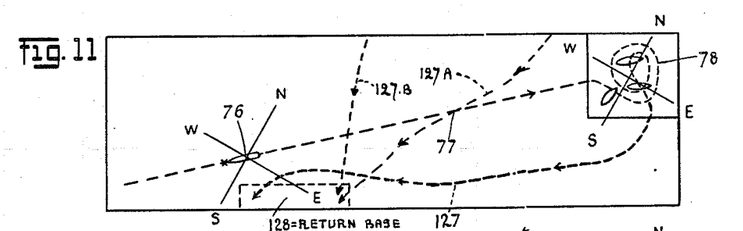
Figures 11 and 12 are schematical plan-views of a course followed by a torpedo provided with the robot orientation device of this invention.

In the case that the torpedo falls at point 76, Figure 11, so that its longitudinal axis coincides with course 77, the direction propeller will automatically switch off, the main motor will switch on and the torpedo will move accordingly.

Figure 12:
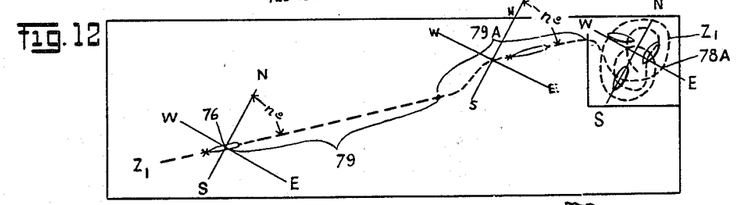

If, when the torpedo falls at point 76, Figure 11, its axis does not coincide with course 77, then the proceeding will be as described in Figures 8 and 9, i. e. the torpedo will turn the required $n°$ (Figure 12), and thereafter follow the predetermined course shown for example in Figure 12— partly straight 79 and thereafter curved 79A, and thereafter in the form of a spiral 78A.

If it is necessary to send the torpedo a long distance on a straight course and the torpedo is thrown off its course by a high wave, or for some other reason, this invention provides that the needle 54 will instantly discontinue registering the beam 59, the main motor will switch off automatically, the direction propeller will automatically switch on and steer the torpedo by turning it around its vertical axis until its correct orientation is reestablished, whereafter the robot orientation device of the torpedo will start to actuate. This will take place each time the torpedo goes off its course.

Another important aspect of this invention comprises a method and devices for synchronizing the action of the robot orientation device with the main motor, the motor that operates the direction propeller and the direction controlling device. This is illustrated schematically on Figure 14.

Figure 14:
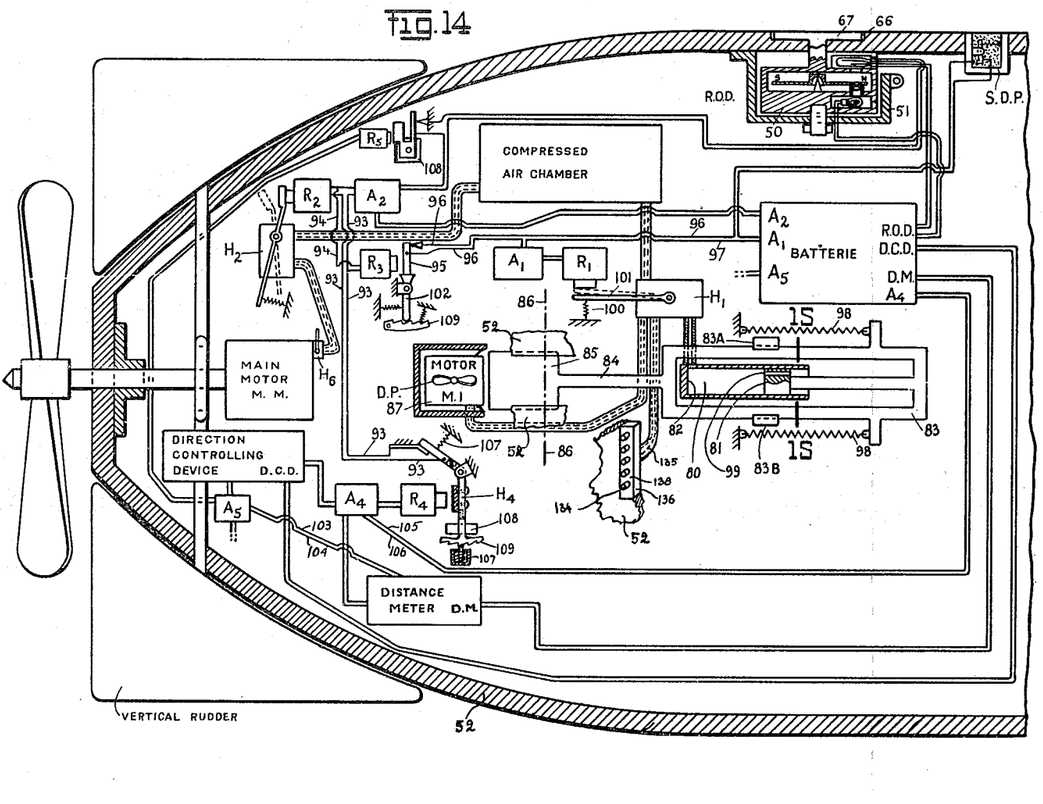
Figure 14 is a schematical view of devices and method to operate a torpedo provided with the robot orientation device and other devices according to this invention.
Figure 15:
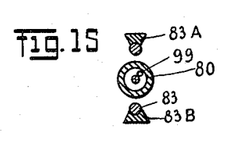
Figure 15 is a plan view, partly in cross section of a direction propeller cylinder.
Figure 16:
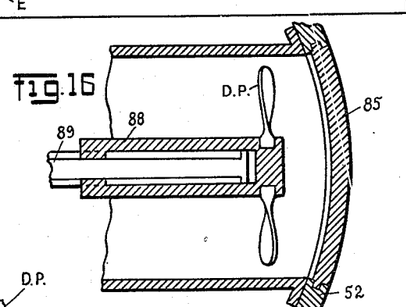
Figures 16 and 17 are side-views, partly in cross-section, of the direction propeller.
Figure 17:
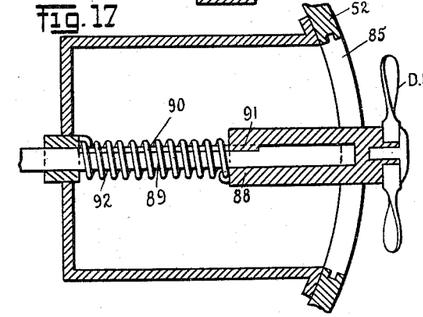
Figure 18:
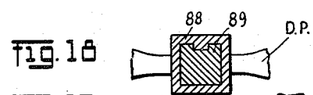
Figure 18 is a partial cross-section of the shaft and sliding tubular axle of a direction propeller as shown on Figure 17.

As soon as the torpedo touches the water, a switch or switches (Figure 14, S. D. P.) operated by contact with the water or by the dissolving of a chemical compound in water, will be automatically actuated and will open the valve $H_1$ either mechanically (not shown on the drawings being self-explanatory) or by means of an electric current which passes to the relay or solenoid $R_1$, Figure 14, if desired via an amplifier $A_1$. As soon as $H_1$ is open, the compressed air will pass from the compressed air chamber through $H_1$ to the motor $M_1$ which begins to rotate the direction propeller. Simultaneously, the same valve $H_1$ will begin to send the compressed air to a cylinder 80 pushing the piston 81 from the top 82 of the cylinder to its position as shown on the drawings. The piston is operatively connected by rigid means 83 (flexible or pulley) to the rod 84 attached to sliding door 85, or pivoting door pivoted around axis 86. If desired, the rod or rods 83 may be guided between guide-means 83A and 83B. Sliding door 85 opens the window 87 and the direction propeller is then pushed out by its own rotation actuated by a sliding tubular axle 88, shown on Figures 16 and 17, mounted slidably on the shaft 89.

The shaft is provided with a groove 90 in which the pin 91 of the tubular axle 88 slides. As soon as the direction propeller begins to rotate, it automatically slides out from its original position as shown on Figure 16 to the position shown on Figure 17. A spring 92 pulls the direction propeller back after the motor has stopped running.

Figure 19:
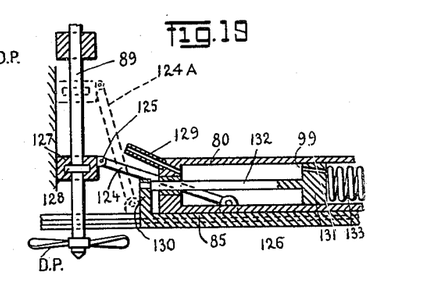
Figure 19 is a side view in cross section of another type of the direction propeller.

Instead of the propeller being pushed out by its own rotation, as shown on Figures 15, 16, 17 and 18, it may be operated by a lever 124, Figure 19, which pivots around pivots 125 and 126. One end of lever 124 is mounted on the pivot 126 which is provided on the sliding door 85; the other end of the lever is mounted on pivot 125 which is rigid with a bearing 127 surrounding the arresting means 128 which is rigidly mounted on the axle 89.

The air is admitted through a tube 129. A pusher 130 may be rigidly connected with piston 131 and with sliding door 85 by means of rod 132 which performs the same function as rod 84, Figure 14. Spring 133 assists the return of the lever 124 to its original position.

Another embodiment which substitutes for the turning action provided by motor $M_1$ and the direction propeller, comprises one or more small openings 134 (shown slightly in perspective) connected with a tubular conduit 135, Figure 14, which is preferably interconnected with the valve $H_1$ so that when the valve is switched on, the compressed air passes through the tubular conduit to the openings 134 and through a collector chamber 136 which may be provided if desired. The air will then push the torpedo and turn it in the same manner as the direction propeller herein described. This pneumatic arrangement will avoid other means necessary for actuating the direction propeller, i. e. the motor, the sliding door and the propeller. Openings 134 may have any form and shape and their longitudinal axes may lie at any suitable angle to the horizontal or vertical planes.

As soon as the direction propeller turns the torpedo so that the magnet needle 54 registers its axis Z—Z with the course $Z_1$—$Z_1$ predetermined (Figures 8 and 9), then the electric current from the photo-electric cell 61 preferably passing through an amplifier $A_2$ will operate the relay or the solenoid $R_2$, in turn operating valve $H_2$ and the main motor MM. Simultaneously therewith, the electric current produced in $A_2$ is transmitted through the wires 93—94 to the relay or solenoid $R_3$ which cuts off switch 95 thus interrupting wire 96. This actuates valve $H_1$ in reverse and closes off the admission of air into the cylinder 80; the direction propeller motor M stops and the sliding door closes by means of spring 98 enabled by a small channel 99 which is provided in piston 81 to permit the piston to return to the bottom 82 of cylinder 80. The channel 99 should be so small that notwithstanding escape of air therethrough, the pressure of compressed air on the piston 81 will still be sufficient to open the door. A spring 100 is provided to return the lever 101 of valve $H_1$ to its stationary position when current is cut off and lever 102 is actuated by means of the relay or solenoid $R_3$.

Should the torpedo follow a non-prescribed course for example, instead of following the predetermined straight course $Z_1$—$Z_1$ shown on Figure 12, then the magnet needle 54 being displaced from its initial position which registers the beam, will interrupt or change or eliminate the current previously produced and will consequently stop the main motor MM and switch on again the direction propeller and the motor $M_1$; the procedure is thereafter repeated as previously described.

In the case that the direction controlling device is employed, it is put into operation automatically and synchronized with the running of the main motor, i. e. with the length of the course prescribed.

If desired, the direction propeller and its motor $M_1$ may be switched off completely, in which case the distance meter and/or the direction controlling device will provide an impulse transmitted by a current via wires 103, 104, or 105, 106 to a relay or solenoid $R_4$, or transmitted mechanically, (not shown) which will operate the switch lever $H_4$ and disconnect the wire 93—93. If it is desired that this disconnection of the direction propeller and motor be permanent, then the provision of return means such as the spring 107 and means 108 will not be required and a non-return zig-zag guide-member 109 may be provided. It will also be necessary to provide lever 102 with a member having a zig-zag non-return contour with which to block it, as soon as it is actuated by the impulse received from $A_2$ via $R_3$.

Figure 20:
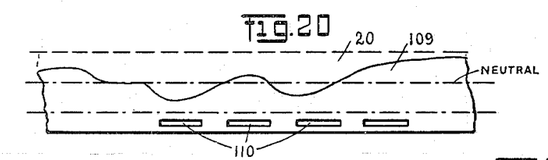
Figure 20 is a plan view of a direction controlling device band.
Figure 21:
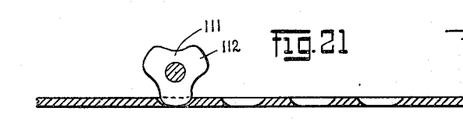
Figure 21 is a side view of Figure 20.
Figure 22:
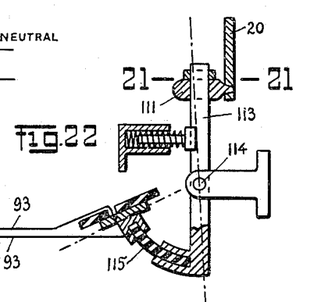
Figure 22 is a cross-sectional side-view of a controlling device used in combination with the cut-out band shown on Figure 20.

This invention also embodies means to switch off the robot orientation device permanently at any desired point of the torpedo's course. This means may be so designed that it will have a band 109 provided with special perforations 110 as shown on Figures 20, 21 and 22, in which perforations the teeth 112 of the free rotating wheel 111 will register. The lever 113 pivoted around pivot 114 will thereat disconnect the wire 93 by sliding out contacting member 115. The same result may be achieved by a single long perforation together with a roller or by a switch lever 113 adapted to roll on the moving contour of the direction controlling device band 116 having a cut-out 117, as shown on Figure 24. Instead of the lever 113, a pivotal linked-lever 118—119, Figure 23, may be employed. Also any of the known means in use today may be employed for this purpose.

In the case that it is desired to make the torpedo follow a straight line for, say, W miles, after it has been orientated by the robot orientation device, the direction controlling device band may be synchronized and designed accordingly.

The direction propeller may be cut off permanently by an impulse provided by the distance meter or by the direction controlling device at any time and point of the torpedo's course.

After the torpedo has traversed the W miles, the direction controlling device may be so predetermined that the torpedo will take any desired curve for its final course.

Figures 23, 24, 26:
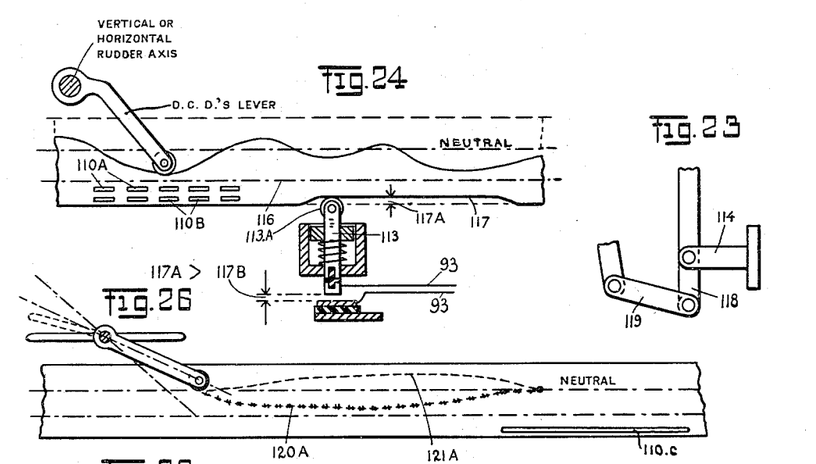
Figure 23 is a side view of another control lever.
Figure 24 is a plan view of a direction controlling device band with another switch-control lever.
Figures 26 and 27 are plan views of a direction controlling device band.
Figure 25:
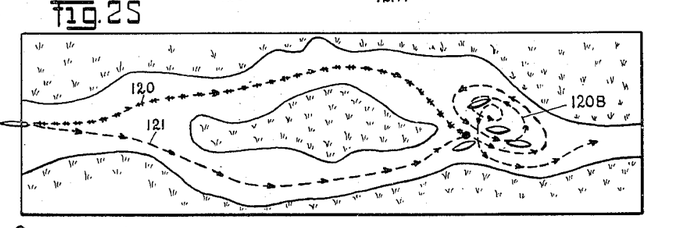
Figure 25 is a schematical view of one of the courses of a torpedo.

If the initial course is curved, as shown for example by 120 or 121 on Figure 25, then the direction controlling device must be provided with a band having the corresponding curves 120A and 121A, Figure 26.

Figure 27:
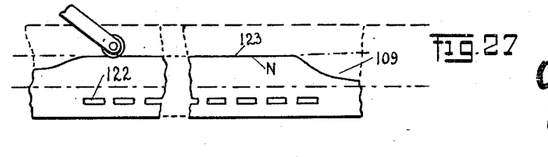

The action of the direction controlling device switch 113 actuated by the changes in the profile of the band, as shown on Figures 21, 22, 23 and 24, may, if desired, be synchronized with the position of the vertical rudder, whereat the perforations 122, Figure 27, should be synchronized with the starting line 123 situated on the neutral line N of the band 109.

This invention also provides ways and means to return the torpedo to its base in the case it has not hit the desired objective. For this purpose the direction controlling device band may be provided with the necessary suitable contour. The torpedo can either stop before it starts on its return journey or reverse itself on the receipt by the robot orientation device of a signal from the direction controlling device or from the distance meter or from a time-clock meter aided by means similar to that used for providing the other impulses herein described.

If desired, the direction controlling device band may be provided with a second curve of perforations 110B in addition to 110A, as shown on Figure 24, together with two lever wheel devices similar in character to 113, which will give the necessary impulses to the robot orientation device and to the direction controlling device and if necessary, to the direction propeller for the return of the torpedo to its base. It may also be so designed that the detonator will also be automatically switched off and thus render the returning torpedo non-explosive. This feature of the invention is shown on Figure 11, 127, which depicts the course of the torpedo back to its base 128.

The torpedo may then be removed from the sea and be refilled with compressed gas, air, or otherwise charged, and a new direction controlling device for re-use.

If desired, a similar device such as 110, 110B or 117, in combination with the direction controlling device band, may be employed to control a special valve $H_8$, Figure 14, placed near the main motor to regulate the intensity, speed, quantity, or flow of the air.

Also, the same type or similar device as 110 or 110B may be operatively connected, mechanically or by relays, to control the orientation disk 67. A mechanical arrangement may be used to transmit the slidable lever 113 to at least one other lever 124, Figure 9, pivotally affixed to the orientation disk 67, which as soon as the transmitted impulse is received, turns from North to West (or East) at the desired $n°_1$ point. The $n°_1$ can be exactly controlled by an adjustable lever contact end 125 operatively and pivotally connected with the orientation disk. The lever 124 may move slidingly in guide means 126 rigid with respect to the frame 62 of the robot orientation device.

The slidable lever 113 may also be provided with mechanically adjustable means with which to regulate the amount of displacement on its operating-transmitting end, so that it will produce $n°_1$ displacement of the disk 66. The lever may also have a roller 113A to contact the band of the direction controlling device.

The practical application of the devices and methods herein disclosed requires a coefficient of correction for obtaining results of high accuracy. This may be achieved by setting the robot orientation device so that the switching off of the direction propeller and the switching on of the main motor will occur at such a time that it will propel the torpedo in the required direction.

Obviously, when the motor $M_1$ operating the direction propeller DP stops running, the torpedo's inertia will cause it to continue to turn about its vertical axis. Hence, the robot orientation device has to be so set that the motor will start to operate before the torpedo has completed its movement and faces the direction in which it is to travel. This can easily be realized by changing the $n°$ of the orientation dial to $n°-c°$, wherein the $c°$ will be the coefficient of correction established by experience for each type of moving body, taking into consideration the medium in which it works, the characteristics of the direction propeller DP, the motor $M_1$ and the main motor, etc.

If it is not considered desirable to have the magnet finger 54 of the mariner's compass 62 too strongly influenced by the rolling and/or pitching of the torpedo, special type of compass mounting (as shown on Figure 10) may be employed, wherein a heavy weight 75 is rigidly attached to a rod 75A so that the center of gravity of the weight lies on the axis passing through the axis of rotation of the magnet finger 54.

The frame 62 of the compass pivots around a horizontal axis SA—SA parellel to East-West on the dial of the compass, by means of two pivots mounted on supports 76A and pivoted in bearings provided therefor in frame 62. This is shown on Figure 10.

Figure 10:
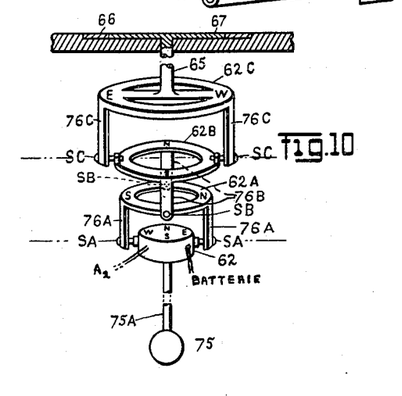
Figure 10 is a schematical perspective view partly in cross-section of a special magnet particularly adaptable for use with the robot orientation device.

The supports 76A are rigid with frame 62A which pivots around an axis SB—SB parallel to North-South on the dial of the compass. This is accomplished by means of two pins pivoted in two bearings which are provided respectively in the two supports 76B and in the frame 62A. The frame 62B to which the supports 76B are rigidly affixed, is itself pivoted around an axis SC—SC which may be parallel to East-West on the compass at any degree to the North-South line on the dial. The pivots and bearings interconnect the supports 76C and the frame 62B, the supports 76C being rigid with the frame 62C on which the axle 65 is mounted.

The orientation disk 67 mounted on axle 65, Figure 10, is operated in the same manner as described for the use of the orientation disk 67 of Figures 8 and 9.

Figure 28:
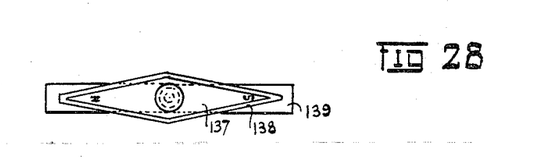
Figure 28 is a plan view of a special magnet needle.
Figure 29:
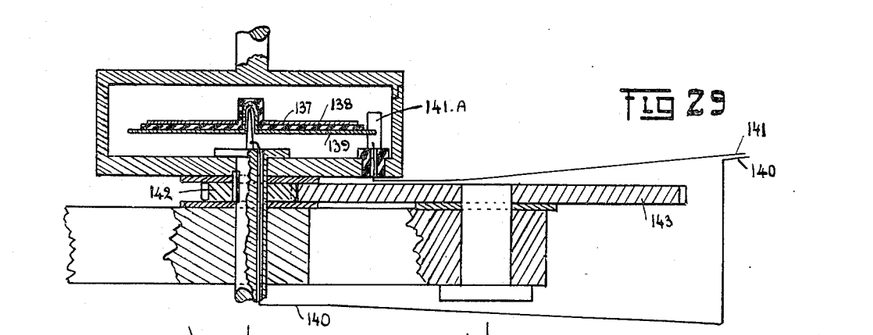
Figure 29 is a cross-sectional view of a robot orientation device.
Figure 30:
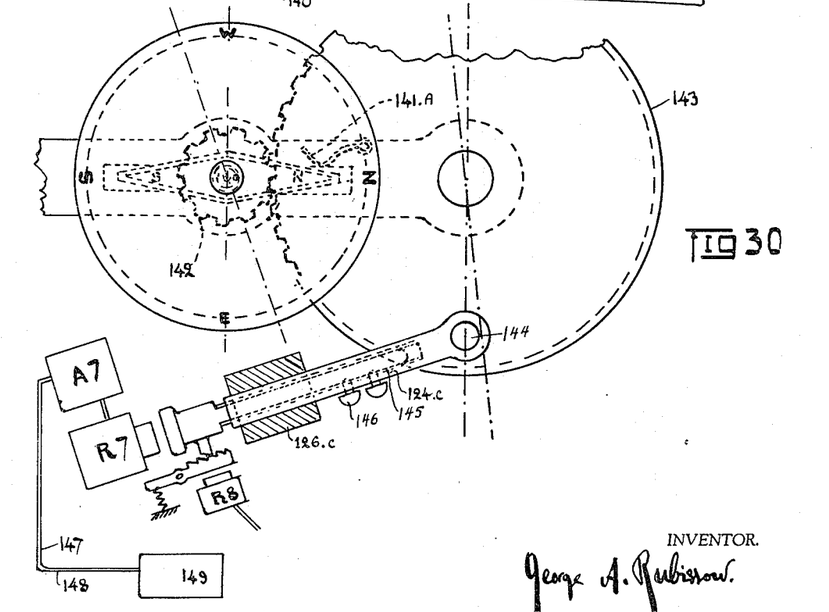
Figure 30 is a plan view of Figure 29.

Still another means for switching on the robot orientation device may consist in employing an ordinary mechanical switch mechanically actuated by the magnet needle, as shown by way of example on Figures 28, 29 and 30. The needle or the like 137 may be mounted on a support 138 made of insulating material, on the lower part of which is affixed a member 139 made of copper, gold, platinum, or other non-magnetic metal. One wire 140 leading to $H_2-A_2-R_2$ may contact the magnet axle of the magnet needle 137 and the electric current will pass through support member 139.

Another wire 141 may contact an arresting contact member 141A affixed rigidly to the frame of the compass—e. g. at the point where the beam of light 54 passes. An arrangement such as this will provide the same switching off and on action as will the use of the light beam 54 and the photoelectric cell.

The orientation dial 66 will substitute for the light beam 54 and operate in the same manner provided that the contact member 141A is affixed in the place where the light-beam 54 passes. This contact member may be a thin elastic platinum strip, able to provide a good contact surface with the member 139 which may have any desirable shape or form. The needle 137 may be placed below or above 138 and/or 139. The member 139 may be wider or larger than the needle and may have parts extending sidewise, downwards or upwards to contact the member 141A. Instead of one member 141A, a second similar member may be provided to double the margin of safety for the operation of the switch.

Instead of the lever 113, a geared wheel 142, Figures 29 and 30, may be affixed to axle 65, or to the bottom of the frame 62 of the compass. Another gear 143 of a larger diameter, operatively engaging the first gear, may be mounted on the support of the torpedo or on the wall thereof, and operatively interconnect at point 144 with a lever 145 which pivots around it. The lever 145 may be preferably provided with adjustable means 146 and actuated by a relay or an electro-magnet or solenoid $R_7$. When the lever 145 is displaced for the predetermined desired length, the larger gear 143 turns the orientation disk 66 the corresponding $n°$, the required control of the rudder being achieved when the impulse is transmitted to the relay $R_7$ actuating the lever 145 through amplifier $A_7$. This amplifier is connected by wires 147 and 148 to an impulse-producing device 149, which may be the direction controlling device or the direction meter or a time-clock meter or a specially provided device actuated by radio energy.

Although this invention describes a robot orientation device controlled by a magnet needle, it may also be controlled by a device or a needle or by radio waves, i. e. by electro-magnetic waves. For such purpose, instead of a compass 62, a radio compass should be employed and installed so that it switches on the robot orientation device and thereafter actuates the $A_2-R_2-H_2$ as soon as the $n°$ radio compass coincides with the direction of a radio beam which is sent from a radio sending station.

This specification refers especially to the use of the invention described in combination with a direction controlling device. It should be noted that this device is not limited to operation in one plane, i. e. limited to following a course depending only on vertical rudders. The rudders may be horizontal in which case the moving body will go up and down. A double direction controlling device may also be employed, whereby the moving body may simultaneously follow a course in three dimensions.

This invention may be used in combination with any type of moving body, as follows:

(1) A boat, ship, or surface torpedo, able to float only on the surface of the water and carry an explosive which will explode either (a) automatically after it has run its predetermined course, or (b) after it has hit its objective, or (c) automatically after a predetermined length of time has elapsed.

(2) An air torpedo or air zeppelin such as self-propelled bombs, or self-propelled aircraft carrying explosive.

(3) Terrestrial self-propelled torpedo mounted on self-propelled automobile-like chassis (or on a tractor-like "caterpillar-chain" system) propelled electrically, or by compressed air, or by internal combustion engine.

In cases (3) where terrestrial torpedoes are used, the robot orientation device and/or the direction controlling device with which such torpedoes will be equipped, will steer the front and/or the rear wheels of the chassis by suitable arrangements herein described in connection with the operation of the rudders. Thus the torpedoes will be guided entirely automatically and be propelled to their predetermined destinations along the course prescribed.

This invention does not only refer to the use of the devices herein described. Also claimed and covered are the new method and new torpedo tactic, solely provided by the employment of such devices or by the use of devices substantially the same.

Having now ascertained and particularly described the nature of my invention and the manner in which it is to be performed, I declare that what I claim is:

1. In combination with a self-propelling moving body having a main propelling means and a main motor to operate same, a robot orientation device of the character referred to comprising an indicator device directed by pivoting automatically towards a predetermined point on the ground, a rotatable casing for mounting of said indicator device, an axle for mounting said rotatable casing, a photoelectric cell provided on one side of the plane in which said indicator device pivots and mounted rigid in respect to said casing, a source of light mounted rigid in respect to said casing on another side of the plane in which said indicator device pivots, a source of electric energy to energize said photoelectric cell and said source of light, means to adjust by rotation and to control the initial predetermined angular position of said rotatable casing in respect to said moving body, a first propelling means adapted to rotate said moving body about its vertical axis, a first starting means to initiate the operation of the said first propelling means, stopping means to stop the operation of said first propelling means as soon as said moving body has been turned about its vertical axis to such a predetermined angular position of said moving body in respect to the said point on the ground, that said angular position of said moving body coincides with the predetermined course and trajectory of said moving body at the moment it starts to propel, second starting means to initiate the operation of the said main propelling means and of said main motor, as soon as the said stopping means have stopped the operation of said first propelling means.

2. A combination as set forth in claim 1 wherein are additionally provided switching means to switch on and off said first propelling means, said first starting means, said stopping means, said second starting means, various interconnection means to interconnect electrically and mechanically the operation of the said first propelling means, said first starting means, said stopping means and said second starting means.

3. In combination with a self-propelling moving body having a main propelling means and a main motor to operate same, a robot orientation device of the character referred to comprising an indicator device directed by pivoting automatically towards a predetermined point on the ground, a rotatable casing for mounting of said indicator device, an axle for mounting said rotatable casing, a photoelectric cell provided on one side of the plane in which said indicator device pivots and mounted rigid in respect to said casing, a source of light mounted rigid in respect to said casing on another side of the plane in which said indicator device pivots, a source of electric energy to energize said photoelectric cell and said source of light, means to adjust by rotation and to control the initial predetermined angular position of said rotatable casing in respect to said moving body, a first propelling means adapted to rotate said moving body about its vertical axis, a first starting means to initiate the operation of said first propelling means, stopping means to stop the operation of said first propelling means, at least one automatic direction controlling device of the character referred to having a long band freely movable longitudinally, one edge of said band being a straight line and the other edge being of a predetermined contour, a lever mounted to pivot about an axis which is fixed relative to the said moving body, said lever being provided on its one end with guide means which continuously contact the said contour, its outer end operatively interconnected with the axle of at least one of said rudders, said lever being urged towards the said contour by resilient means provided on said lever, rotatable members on which said band is wound and unwound, means establishing a synchronized operative interconnection of one of the said members with one of the shafts of said main propelling means, whereby when the said moving body follows the said predetermined course and trajectory of any expedient length and form, the said trajectory is controlled at every point and prescribed by the corresponding point of the said predetermined contour.

4. A combination as set forth in claim 3, wherein said guide means contact the said contour perpendicular to the longitudinal axis of said contour and parallel to the plane of said band.

5. A combination as set forth in claim 3, wherein said band is provided with another guide means which guides the straight edge of the said band.

6. A combination as set forth in claim 3, wherein at least two of said direction controlling devices are provided, one of which operates the vertical rudder and the other the horizontal rudder of the said moving body.

7. A combination as set forth in claim 1 wherein additionally are provided at least one automatic direction controlling device of the character referred to, having a long band freely movable longitudinally, one edge of said band being a straight line and the other edge being of a predetermined contour, a lever mounted to pivot about an axis which is fixed relative to the said moving body, one end of said lever being provided with guide means which continuously contact the said contour, the outer end of said lever being operatively interconnected with the axle of at least one of said rudders, said lever being urged towards the said contour by resilient means provided thereon, rotatable members on which said band is wound and unwound, means establishing a synchronized operative interconnection of one of the said members with one of the shafts of said main propelling means, whereby when the said moving body follows the said predetermined course and trajectory of any expedient length and form, the said trajectory is controlled at every point and prescribed by the corresponding point of the said predetermined contour, said guide means consisting of a roller provided with runways to register the said predetermined contour, said roller being rotatable on an axle mounted on said lever.

8. A combination as set forth in claim 1 wherein said indicator device comprises a magnetic needle.

9. A combination as set forth in claim 1 wherein the said indicator device comprises a radio-controlled compass.

10. A combination as set forth in claim 1 wherein the said indicator device comprises a magnetic needle, said first propelling means comprising a motor electrically or pneumatically operated, said first starting means, said stopping means and said second starting means comprising at least one relay or electro-magnet with controllable switching means operatively interconnected and synchronized with said indicator device.

11. A combination as set forth in claim 1 wherein the said first propelling means consists of at least one tubular conduit, one end of which is connected through a switch valve with compressed air chamber provided in said body, the other end being extended through the wall of said body, whereby the compressed air when passing out from the said other end turns the said body about its vertical axis.

12. A combination as set forth in claim 1 wherein the said propelling means comprises a motor and a propeller connected with a shaft driven by the said motor, said shaft being preferably horizontal and at a right angle to the longitudinal symmetry axis of said body, a sliding door provided in the wall of said body to permit the said propeller to pass in and out, means to operate the said sliding door synchronized with the position prescribed by said indicator device.

13. A combination as set forth in claim 3 wherein is additionally provided a signal means to initiate a signal, said signal means being preferably a light-producing member which operates as soon as said body reaches a predetermined point on said trajectory.

14. A combination as set forth in claim 3 wherein are additionally provided a signal means to initiate a signal, said signal means being preferably a light-producing member which operates as soon as said body has finished its predetermined trajectory, means being provided to render the said body non-explosive.

15. A combination as set forth in claim 3 wherein are additionally provided a signal means which initiates preferably a light signal as soon as said body has reached a predetermined point of its trajectory, means being provided to render the said body non-explosive, a third starting means to initiate the operation thereof at a predetermined time or point of said trajectory.

16. A combination as set forth in claim 3 wherein are additionally provided a signal means to initiate preferably a light signal as soon as said body has reached a predetermined point of its trajectory, means to render the said body non-explosive, said band being provided with a return direction contour operatively interconnected with the said first starting means to initiate its operation, rotating means to rotate said casing by interconnecting said gears and levers with the said contour of the said band, another stopping means to initiate the stopping of said main motor and said rotating means at a predetermined position of said band, a fourth starting means to initiate the starting of the operation of said third propelling means until the return course and return trajectory of said body coincides with the longitudinal symmetry axis of said body, which is controlled by the predetermined angular position of said indicator device, a fifth starting means to initiate again the operation of said main motor.

GEORGE A. RUBISSOW.